United States Patent
Zhu et al.

(10) Patent No.: US 9,847,819 B2
(45) Date of Patent: Dec. 19, 2017

(54) ADAPTIVE PRECODING IN A MIMO WIRELESS COMMUNICATION SYSTEM

(71) Applicants: Dengkui Zhu, Wanyuan (CN); Ping Liang, Newport Coast, CA (US)

(72) Inventors: Dengkui Zhu, Wanyuan (CN); Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 15/102,014

(22) PCT Filed: Dec. 20, 2014

(86) PCT No.: PCT/US2014/071753
§ 371 (c)(1),
(2) Date: Jun. 6, 2016

(87) PCT Pub. No.: WO2015/095844
PCT Pub. Date: Jun. 25, 2015

(65) Prior Publication Data
US 2016/0323026 A1 Nov. 3, 2016

Related U.S. Application Data

(60) Provisional application No. 61/919,613, filed on Dec. 20, 2013.

(51) Int. Cl.
*H04L 1/02* (2006.01)
*H04B 7/04* (2017.01)
(Continued)

(52) U.S. Cl.
CPC ............ *H04B 7/0482* (2013.01); *H04B 7/046* (2013.01); *H04B 7/0452* (2013.01);
(Continued)

(58) Field of Classification Search
CPC ............ H04W 76/023; H04W 72/0453; H04B 7/0452; H04B 7/0456
(Continued)

(56) References Cited

U.S. PATENT DOCUMENTS

| 5,691,978 A | 11/1997 | Kenworthy |
| 6,891,792 B1 | 5/2005 | Cimini, Jr. et al. |

(Continued)

FOREIGN PATENT DOCUMENTS

| CN | 101193086 A | 6/2008 |
| CN | 102598537 A | 7/2012 |

(Continued)

OTHER PUBLICATIONS

John H. Conway; Ronald H. Hardin, and Neil J. A. Sloane, Packing lines, planes, etc.: packings in Grassmannian spaces, Experimental Mathematics, 1996, 139-159, vol. 5, issue 2.
(Continued)

*Primary Examiner* — Khai Tran
(74) *Attorney, Agent, or Firm* — Guosheng Wang; United States Research and Patent Firm

(57) ABSTRACT

This invention presents methods for estimating MU-MIMO channel information using SU-MIMO channel information to choose a modulation and channel coding appropriate for the quality of the MU-MIMO channels, for adaptively selecting MU-MIMO precoding methods based on estimations of a plural of UEs and for compensating hardware impairments in MU-MIMO precoding.

7 Claims, 3 Drawing Sheets

(51) Int. Cl.

| | |
|---|---|
| *H04L 5/14* | (2006.01) |
| *H04B 7/0452* | (2017.01) |
| *H04B 7/06* | (2006.01) |
| *H04L 5/00* | (2006.01) |
| *H04W 36/08* | (2009.01) |
| *H04W 72/04* | (2009.01) |
| *H04L 1/00* | (2006.01) |

(52) U.S. Cl.
CPC ......... *H04B 7/0626* (2013.01); *H04B 7/0632* (2013.01); *H04L 1/0026* (2013.01); *H04L 5/0048* (2013.01); *H04L 5/14* (2013.01); *H04W 36/08* (2013.01); *H04W 72/0413* (2013.01)

(58) Field of Classification Search
USPC .......... 375/267, 260; 370/329; 455/214, 337
See application file for complete search history.

(56) References Cited

U.S. PATENT DOCUMENTS

| | | |
|---|---|---|
| 7,123,676 B2 | 10/2006 | Gebara et al. |
| 7,505,788 B1 | 3/2009 | Narasimhan |
| 7,596,352 B2 | 9/2009 | Ding et al. |
| 7,821,998 B2 | 10/2010 | Jeong |
| 8,032,080 B2 | 10/2011 | Andersson et al. |
| 8,472,383 B1 | 6/2013 | Banerjea et al. |
| 8,559,485 B2 | 10/2013 | Maca |
| 2003/0053488 A1 | 3/2003 | Hoole |
| 2004/0095907 A1 | 5/2004 | Agee et al. |
| 2005/0128993 A1 | 6/2005 | Yu et al. |
| 2006/0039318 A1 | 2/2006 | Oh et al. |
| 2006/0235667 A1 | 10/2006 | Fung et al. |
| 2007/0223423 A1 | 9/2007 | Kim et al. |
| 2007/0253476 A1 | 11/2007 | Tirkkonen et al. |
| 2008/0095223 A1 | 4/2008 | Tong et al. |
| 2008/0187077 A1 | 8/2008 | Matza et al. |
| 2008/0279170 A1 | 11/2008 | Malladi et al. |
| 2008/0304554 A1 | 12/2008 | Fulghum et al. |
| 2008/0311939 A1 | 12/2008 | Hugl et al. |
| 2009/0054093 A1 | 2/2009 | Kim et al. |
| 2009/0129489 A1 | 5/2009 | Eldar et al. |
| 2009/0175214 A1 | 7/2009 | Sfar et al. |
| 2009/0225721 A1 | 9/2009 | Cudak et al. |
| 2009/0316609 A1 | 12/2009 | Singh |
| 2009/0318183 A1 | 12/2009 | Hugl et al. |
| 2010/0008216 A1 | 1/2010 | Li et al. |
| 2010/0128687 A1 | 5/2010 | Oteri et al. |
| 2010/0150013 A1 | 6/2010 | Hara et al. |
| 2010/0177717 A1 | 7/2010 | Sung et al. |
| 2010/0246526 A1 | 9/2010 | Jing et al. |
| 2010/0311349 A1 | 12/2010 | Koo et al. |
| 2010/0323684 A1 | 12/2010 | Cai et al. |
| 2010/0329375 A1 | 12/2010 | Nakayama |
| 2011/0009105 A1 | 1/2011 | Lee et al. |
| 2011/0080968 A1 | 4/2011 | Seo et al. |
| 2011/0116436 A1 | 5/2011 | Bachu et al. |
| 2011/0134859 A1 | 6/2011 | Li et al. |
| 2011/0141941 A1 | 6/2011 | Lee et al. |
| 2011/0211661 A1 | 9/2011 | Valadon |
| 2011/0235602 A1 | 9/2011 | Ji et al. |
| 2011/0310881 A1 | 12/2011 | Kenington |
| 2012/0051265 A1 | 3/2012 | Shen et al. |
| 2012/0057557 A1 | 3/2012 | Prasad et al. |
| 2012/0063336 A1 | 3/2012 | Shany et al. |
| 2012/0063426 A1 | 3/2012 | Noh et al. |
| 2012/0133557 A1 | 5/2012 | Beaudin |
| 2012/0149296 A1 | 6/2012 | Sawai |
| 2012/0176965 A1 | 7/2012 | Zhu et al. |
| 2012/0188899 A1 | 7/2012 | Zhang et al. |
| 2012/0201191 A1 | 8/2012 | Seo et al. |
| 2012/0252474 A1 | 10/2012 | Tiirola et al. |
| 2012/0257584 A1 | 10/2012 | Behravan et al. |
| 2012/0287900 A1 | 11/2012 | Seo et al. |
| 2012/0294224 A1 | 11/2012 | Silva et al. |
| 2013/0005382 A1 | 1/2013 | Landstrom et al. |
| 2013/0022090 A1 | 1/2013 | Weng et al. |
| 2013/0034066 A1 | 2/2013 | Kakishima et al. |
| 2013/0044650 A1 | 2/2013 | Barker et al. |
| 2013/0044725 A1 | 2/2013 | Chun et al. |
| 2013/0077514 A1 | 3/2013 | Dinan |
| 2013/0077543 A1 | 3/2013 | Kim et al. |
| 2013/0077554 A1 | 3/2013 | Gauvreau et al. |
| 2013/0107916 A1 | 5/2013 | Liu et al. |
| 2013/0114468 A1 | 5/2013 | Hui et al. |
| 2013/0114650 A1 | 5/2013 | Li et al. |
| 2013/0163544 A1 | 6/2013 | Lee et al. |
| 2013/0194931 A1 | 8/2013 | Lee et al. |
| 2013/0208608 A1 | 8/2013 | Piazza et al. |
| 2013/0242720 A1 | 9/2013 | Chou |
| 2013/0265972 A1 | 10/2013 | Shirani-Mehr et al. |
| 2013/0287131 A1 | 10/2013 | Hart et al. |
| 2013/0301487 A1 | 11/2013 | Khandani |
| 2016/0255669 A1* | 9/2016 | Fodor .................. H04B 7/0413 370/329 |

FOREIGN PATENT DOCUMENTS

| | | |
|---|---|---|
| EP | 1703686 A1 | 9/2006 |
| EP | 2648342 A1 | 10/2013 |
| WO | WO2006112030 A1 | 10/2006 |
| WO | WO2009107090 A1 | 9/2009 |
| WO | WO2010121385 A1 | 10/2010 |
| WO | WO2012130371 A1 | 10/2012 |

OTHER PUBLICATIONS

B. Rankov; A. Wittneben, On the Capacity of Relay-Assisted Wireless MIMO Channels, Fifth IEEE Workshop on Signal Processing Advances in Wireless Communications, Jul. 11-14 2004, 323-327, IEEE, Lisboa, Portugal.

Xinying Zhang; A. F. Molisch; Sun-Yuan Kung, Variable-phase-shift-base RF-baseband codesign for MIMO antenna selection, IEEE Transactions on Signal Processing, Nov. 2005, 4091-4103, vol. 53, issue 11, IEEE.

Robert M. Gray, Toeplitz and Circulant Matrices: A Review, Foundations and Trends in Communications and Information Theory, Jan. 31, 2006, 155-239, vol. 2, issue 3.

Qualcomm Europe, [R1-080494] Calibration procedures for TDD beamforming, 3GPP TSG RAN WG1 #51bis meeting, Jan 14-18, 2008, 3GPP, Sevilla, Spain.

Chan-Byoung Chae; Taiwen Tang; Robert W. Heath Jr.; Sunghyun Cho, MIMO Relaying With Linear Processing for Multiuser Transmission in Fixed Relay Networks, IEEE Transactions on Signal Processing, Feb. 2008, 727-738, vol. 56, issue 2, IEEE.

Marek E. Bialkowski; Feng-Chi E. Tsai; Yu-Chuan Su; Kai-Hong Cheng, Design of fully integrated 4×4 and 8×8 Butler matrices in microstrip/slot technology for ultra wideband smart antennas, 2008 IEEE Antennas and Propagation Society International Symposium, Jul. 1-4, 2008, IEEE, San Diego, CA, USA.

Xiaolin Hou; Zhan Zhang; Hidetoshi Kayama, DMRS Design and Channel Estimation for LTE-Advanced MIMO Uplink, Vehicular Technology Conference Fall (VTC 2009-Fall), 2009 IEEE 70th, Sep. 1-5, 2009, IEEE, Anchorage, AK.

ITU-R M.2135-1, Guidelines for evaluation of radio interface technologies for IMT-advanced, International Communication Union (ITU), Dec. 2009, ITU.

Wei Xu; Xiaodai Dong, Limited feedback design for MIMO-relay assisted cellular networks with beamforming, 2010 IEEE International Symposium on Information Theory, Jun. 13-18, 2010, 2348-2352, IEEE, Austin, Texas, USA.

Vijay Venkateswaran; Alle-Jan van der Veen, Analog Beamforming in MIMO communication Shift Networks and Online Channel Estimation, IEEE Transactions on Signal Processing, Aug. 2010, 4131-4143, vol. 58, issue 8, IEEE.

3GPP TR 36.814, 3rd Generation Partnership Project; Technical Specification Group Radio Access Network; Evolved Universal

(56) References Cited

OTHER PUBLICATIONS

Terrestrial Radio Access (E-TURA); Further advancements for E-UTRA physical layer aspects (Release 9), 3GPP, Oct. 2010, version v9.0.0, 3GPP.
Thomas L. Marzetta, Noncooperative Cellular Wireless with Unlimited Numbers of Base Station Antennas, IEEE Transactions on Wireless Communications, Nov. 2010, 3590-3600, vol. 9, issue 11, IEEE.
Y. Ming Tsang; Ada S. Y. Poon; Sateesh Addepalli, Coding the Beams: Improving Beamforming Training in mmWaveCommunication System, IEEE Global Telecommunications Conference (GLOBECOM 2011), Dec. 1-6, 2011, IEEE, Houston, Texas, USA.
Junyoung Nam; Jae-Young Ahn; Ansuman Adhikary; Giuseppe Caire, Joint spatial division and multiplexing: Realizing massive MIMO gains with limited channel state information, Information Sciences and Systems (CISS), 2012 46th Annual Conference on , Mar. 1-6, 2012, IEEE, Princeton, NJ, USA.
Hoon Huh; Antonia M. Tulino; Giuseppe Caire, Network MIMO With Linear Zero-Forcing Beamforming: Large System Analysis, Impact of Channel Estimation, and Reduced-Complexity Scheduling, IEEE Transactions on Information Theory, May 2012, 2911-2934, vol. 58, issue 5, IEEE.
W.L. Stutzman and G.A. Thiele, Antenna Theory and Design, 3rd edition, May 2012, 1-848, Wiley.
Clayton Shepard; Hang Yu; Narendraanand; Li Erran Li; Thomas Marzetta; Richard Yang; Lin Thong, Argos: Practical Many-Antenna Base Stations, Proceedings of the 18th annual international conference on Mobile computing and networking (Mobicom '12), Aug. 22-26, 2012, 53-64, ACM, Istanbul, Turkey.
Yingbo Hua; Ping Liang; Yiming Ma; Ali Cagatay Cirik; Qian Gao, A Method for Broadband Full-Duplex MIMO Radio, IEEE Signal Processing Letters, Oct. 2012, 793-796, vol. 19, issue 12, IEEE.
Theodore S. Rappaport; Shu Sun; Rimma Mayzus; Hang Zhao; Yaniv Azar;Kevin Wang; George N. Wong; Jocelyn K. Schulz; Mathew Samimi; Felix Gutierrez, Millimeter Wave Mobile Communications for 5G Cellular: It Will Work!, IEEE Access, 2013, 335-349, vol. 1, IEEE.
Fredrik Rusek; Daniel Persson; Buon Kiong Lau; Erik G. Larsson; Thomas L. Marzetta; Ove Edfors; Fredrik Tufvesson, Scaling Up MIMO: Opportunities and Challenges with Very Large Arrays, IEEE Signal Processing Magazine , Jan. 2013, 40-60, vol. 30 , issue 1, IEEE—Institute of Electrical and Electronics Engineers Inc.
Ansuman Adhikary; Junyoung Nam; Jae-Young Ahn; Giuseppe Caire, Joint Spatial Division and Multiplexing, arXiv, Jan. 2013, vol. abs/1209.1402v2, [online], http://arxiv.org/abs/1209.1402.
Jakob Hoydis; Stephan Ten Brink; Merouane Debbah, Massive MIMO in the UL/DL of Cellular Networks: How Many Antennas Do We Need?, IEEE Journal on Selected Areas in Communications, Feb. 2013, 160-171, vol. 31, issue 2, IEEE.
3GPP TS 36.211, 3rd Generation Partnership Project; Technical Specification Group Radio Access Network; Evolved Universal Terrestrial Radio Access (E-TURA); Physical Channels and Modulation (Release 12), 3GPP, Mar. 2013, version v12.1.0, 3GPP.
Hemanth Prabhu; Joachim Rodrigues; Ove Edfors; Fredrik Rusek, Approximative matrix inverse computations for very-large MIMO and applications to linear pre-coding systems, 2013 IEEE Wireless Communications and Networking Conference (WCNC), Apr. 2013, 2710-2715, IEEE, Shanghai, China.

3GPP TS 36.104, 3rd Generation Partnership Project; Technical Specification Group Radio Access Network; Evolved Universal Terrestrial Radio Access (E-TURA); Base Station (BS) Radio Transmission and Reception (Release 12), 3GPP, Jun. 2013, version v12.4.0, 3GPP.
Dinesh Bharadia; Emily Mcmilin; Sachin Katti, Full Duplex Radios, Proceedings of the ACM SIGCOMM 2013 (SIGCOMM '13), Aug. 12-16, 2013, 375-386, hongkong, China.
Sooyoung Hur; Tarioon Kim; David J. Love; James V. Krogmeier; Tiomthy A. Thomas; Amitava Ghosh, Millimeter Wave Beamforming for Wireless Backhaul and Access in Small Cell Networks, IEEE Transactions on Communications, Oct. 2013, 4391-4403, vol. 61, issue 10, IEEE.
Akbar Sayeed; John Brady, Beamspace MIMO for high-dimensional Multiuser Communication at millimeter-wave Frequencies, 2013 IEEE Global Communications Conference (GLOBECOM), Dec. 2013, 3679-3684, IEEE, Atlanta, GA.
Guanbo Zheng; Cunqing Hua; Rong Zheng; Qixin Wang, A robust relay placement framework for 60GHz mm Wave wireless personal area networks, 2013 IEEE Global Communications Conference (GLOBECOM), Dec. 2013, 4816-4822, IEEE, Atlanta, GA.
Supplemental Partial European Search Report in EP 14871852 dated. Dec. 13, 2016.
WIPO, PCT/US16/39684 Search Report and Written Opinion of the International Search Authority.
WIPO, PCT/US16/41668 Search Report and Written Opinion of the International Search Authority.
WIPO, PCT/US16/37625 Search Report and Written Opinion of the International Search Authority.
WIPO, PCT/US16/30862 Search Report and Written Opinion of the International Search Authority.
WIPO, PCT/US16/27007 Search Report and Written Opinion of the International Search Authority.
WIPO, PCT/US16/13742 Search Report and Written Opinion of the International Search Authority.
Taneli Riihonen; Stefan Werner; Risto Wichman, Hypoexponential Power-Delay Profile and Performance of Multihop OFDM Relay Links, IEEE Transactions on Wireless Communication, Dec. 2010, 3878-3888, vol. 9, issue 12, IEEE.
WIPO, PCT/US14/65853 Search Report and Written Opinion of the International Search Authority, Published May 21, 2015.
WIPO, PCT/US14/71753 Search Report and Written Opinion of the International Search Authority, Published Jun. 25, 2015.
WIPO, PCT/US14/71752 Search Report and Written Opinion of the International Search Authority, Published Jun. 25, 2015.
WIPO, PCT/US15/52386 Search Report and Written Opinion of the International Search Authority, Published Mar. 31, 2016.
WIPO, PCT/US15/56500 Search Report and Written Opinion of the International Search Authority, Published Apr. 28, 2016.
WIPO, PCT/US16/13743 Search Report and Written Opinion of the International Search Authority, 2016.
WIPO, PCT/US16/13744 Search Report and Written Opinion of the International Search Authority, 2016.
WIPO, PCT/US16/13750 Search Report and Written Opinion of the International Search Authority, 2016.
WIPO, PCT/US16/13752 Search Report and Written Opinion of the International Search Authority, 2016.

* cited by examiner

ADAPTIVE PRECODING IN A MIMO WIRELESS COMMUNICATION SYSTEM

This application claims the benefit of U.S. Provisional Application No. 61/919,613, filed on Dec. 20, 2013.

FIELD OF INVENTION

This invention relates generally to wireless communications, and in particular, to the mechanism for a Base Station (BS) to estimate channel quality information (CQI) and apply adaptive precoding according to system information, Channel State Information (CSI) and the error of its estimation for each User Equipment (UE) in a large-scale MIMO wireless communication system.

BACKGROUND

In a large-scale MIMO or massive MIMO system, the BS is equipped with dozens of or even hundreds of transmitting antennas. It has received enormous attention due to its ability for providing linear capacity growth without the need of increased power or bandwidth and is a key technique for the next generation wireless communication systems (e.g., beyond 4G, 5G). This advantage is realized by employing Multi-User MIMO (MU-MIMO) where the number of paired users is more than that of traditional systems. In this system, the BS selects users at each scheduling slot and transmits data to these users on the same time and frequency resource block. Precoding vectors are used to map the transmitting signals to the hundreds of transmitting antennas. In practical systems, when the channel quality of users is poor, a precoding matrix that matches the wireless channel can be applied to achieve the array gain such that it enhances the quality of the receive signals. One such precoding method is Conjugate Beamforming (CB). For CB precoding, the precoding vector of the kth user is $w_k^{CB} = c_k h_k^H$. When the channel quality is good, the multi-user interference is the major factor that affects the throughput of the system, hence a precoding vector that removes this interference is needed to enhance the system throughput. One such precoding method is Zero-Forcing (ZF). For ZF precoding, the precoding vector of the kth user is $w_k^{ZF} = p_k(I - \tilde{H}_k^H(\tilde{H}_k\tilde{H}_k^H)^{-1}\tilde{H}_k)h_k^H$, where $\tilde{H}_k$ is the multi-user interference channel of the kth user defined as $\tilde{H}_k = [h_1^T \ldots h_{k-1}^T h_{k+1}^T \ldots h_K^T]^T$. Moreover, because of system errors, e.g., limited feedback bandwidth or measurement errors, there always exist unavoidable CSI errors. As a result, it is a challenge for the BS to compare these two precoding methods and adaptively employ a preferred precoding method for the UEs.

SUMMARY

This invention provides a method for solving a fundamental problem in MU-MIMIO, namely, how to estimate MU-MIMO CQI values for all UEs in a group when only single-user MIMO (SU-MIMO) CQI values of these UEs are available. This is important because MU-MIMO CQI values are needed to choose proper modulation and channel coding schemes. However, while SU-MIMO CQI may be determined from measurements using transmission of pilot or test signals, it is often impractical to directly determine MU-MIMO CQI from measurements using transmission of pilot or test signals. In the latter case, channel reciprocity in Time-Division Duplexing (TDD) channels does not help, and for both Frequency-Division Duplexing (FDD) and TDD channels, pilot or test signals must be transmitted by a BS using a MU-MIMO precoding to all UEs in the group, and the MU-MIMO CQI values need to be determined at each UE and fed back to the BS. In the embodiments of this invention, the MU-MIMO CQI can be estimated using the SU-MIMO CQI of the UEs in the group, thus significantly reducing the overhead needed for direct determination of MU-MIMO CQI from measurements, and making MU-MIMO more feasible. Once MU-MIMO CQI values are available, the proper modulation and channel coding can be selected and the sum rate of MU-MIMO using the chosen MU-MIMO precoding can be estimated.

This invention provides an adaptive precoding method using the above MU-MIMO CQI estimation method and applies adaptive precoding for the users in a MU-MIMO user group. In this method, the BS collects system information, such as the number of transmitting antennas in the downlink, the number of UEs in a MU-MIMO user group, and information about each UE, such as Channel Quality Information (CQI) and the errors in the estimation of the CSI, referred to as CSI error. With this information, the BS could estimate the sum rate of one or more precoding methods, e.g., CB and ZF, respectively, and choose the precoding matrix with the larger sum rate.

Hardware impairment, especially in UE, is a limiting factor in the performance of MU-MIMO system. The invention also provides a method for characterizing hardware impairments and using the data from the characterization to modify the precoding to compensate for the hardware impairments.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block represents a method step or an apparatus element for performing the method step. Depending upon the implementation, the corresponding apparatus element may be configured in hardware, software, firmware or combinations thereof.

In the considered wireless communication system, the BS has N transmitting antennas in the downlink, while without loss of generality each UE has one receiving antenna. It is straightforward to generalize to UEs with more than one receiving antenna.

Figure 1:
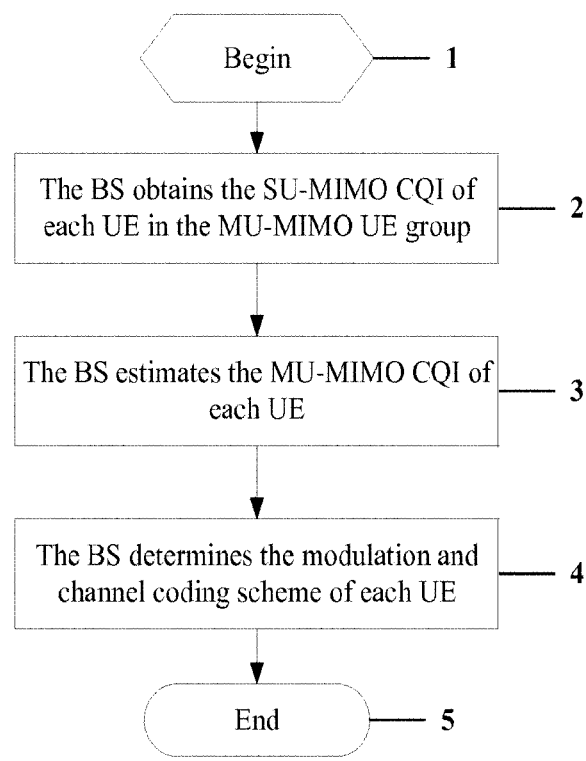
FIG. 1 is a flowchart of an embodiment for estimating MU-MIMO CQI from SU-MIMO CQI.

Without loss of generality, we assume that the BS has selected UEs to be included in a MU-MIMO group, which means that the indices of the K UEs that may be scheduled on the same resource allocation are determined. Then, the BS begins the process of the estimation of MU-MIMO CQI from SU-MIMO CQI 1 which is presented in FIG. 1. First, the BS obtains the SU-MIMO CQI of each UE in the MU-MIMO UE group 2. Then, the BS estimates the MU- MIMO CQI of each UE 3. With the estimation of MU-MIMO CQI of each UE, the BS then determines the modulation and channel coding scheme of each UE 4. After it, the process ends 5. The embodiments may be carried out for each resource block, which is defined as several subcarriers in frequency domain or several Orthogonal Frequency-Division Multiplexing (OFDM) symbols in the time domain.

One embodiment is a method for estimating MU-MIMO CQI values 3 comprising a BS obtaining SU-MIMO CQI values of a plural of UEs 2, which can be either by UEs transmitting test or pilot signals to the BS in case of reciprocal channels or BS transmitting test or pilot signals to the UEs and UEs feeding back their CQI values to the BS in case of non-reciprocal channels. Then, the BS estimates the MU-MIMO CQI values for the plural of UEs using the SU-MIMO CQI values. Formulas that can provide MU-MIMO CQI values for a plural of UEs using the SU-MIMO CQI values are listed below.

The MU-MIMO CQI estimation formula depends on the selected precoding method, which includes at least CB and/or ZF. For example, the formula for CB is $$SINR_k^{CB} = \frac{\alpha_k^2 N}{K + KN\gamma_k - 1}$$

or $$SINR_k^{CB} = \frac{\alpha_k^2}{\sum_{\substack{j=1 \\ j \neq k}}^{K} |u_k u_j^H|^2 + K\gamma_k},$$

and the formula for ZF is $$SINR_k^{ZF} = \left( \frac{\alpha_k^2(N - K + 1)}{(1 - \alpha_k^2 - K\gamma_k)(K - 1) + NK\gamma_k} \right)$$

or $$SINR_k^{ZF} = \frac{\alpha_k^2 \left(1 - \sum_{\substack{j=1 \\ j \neq k}}^{K} |u_k u_j^H|^2\right)^2}{(1 - \alpha_k^2 - K\gamma)\sum_{\substack{j=1 \\ j \neq k}}^{K} |u_k u_j^H|^2 + K\gamma_k},$$

or $$SINR_k = \frac{1 - u_k \tilde{H}_k^H \tilde{H}_k u_k^H}{K\gamma_k}, k = 1, \cdots, K,$$

where $1/\gamma_k$ is the reciprocal of the CQI of the kth UE, $u_k$ is the normalized channel coefficient vector of the kth user (If $u_k$ is not a unit norm, replace it with $$\frac{u_k}{\|u_k\|_2});$$

the mutual interference channel of the kth UE is $\tilde{H}_k = [u_1^T \ldots u_{k-1}^T u_{k+1}^T \ldots u_K^T]^T$, and $a_k$ is the CSI error of the kth UE. The method to acquire $a_k$ by the BS is provided by this invention.

Furthermore, once estimates of the MU-MIMO CQI values are obtained, the BS chooses a modulation and channel coding appropriate for the quality of the MU-MIMO channels 4. The BS may also choose a precoding that increases the sum rate of the plural of UEs.

Figure 2:
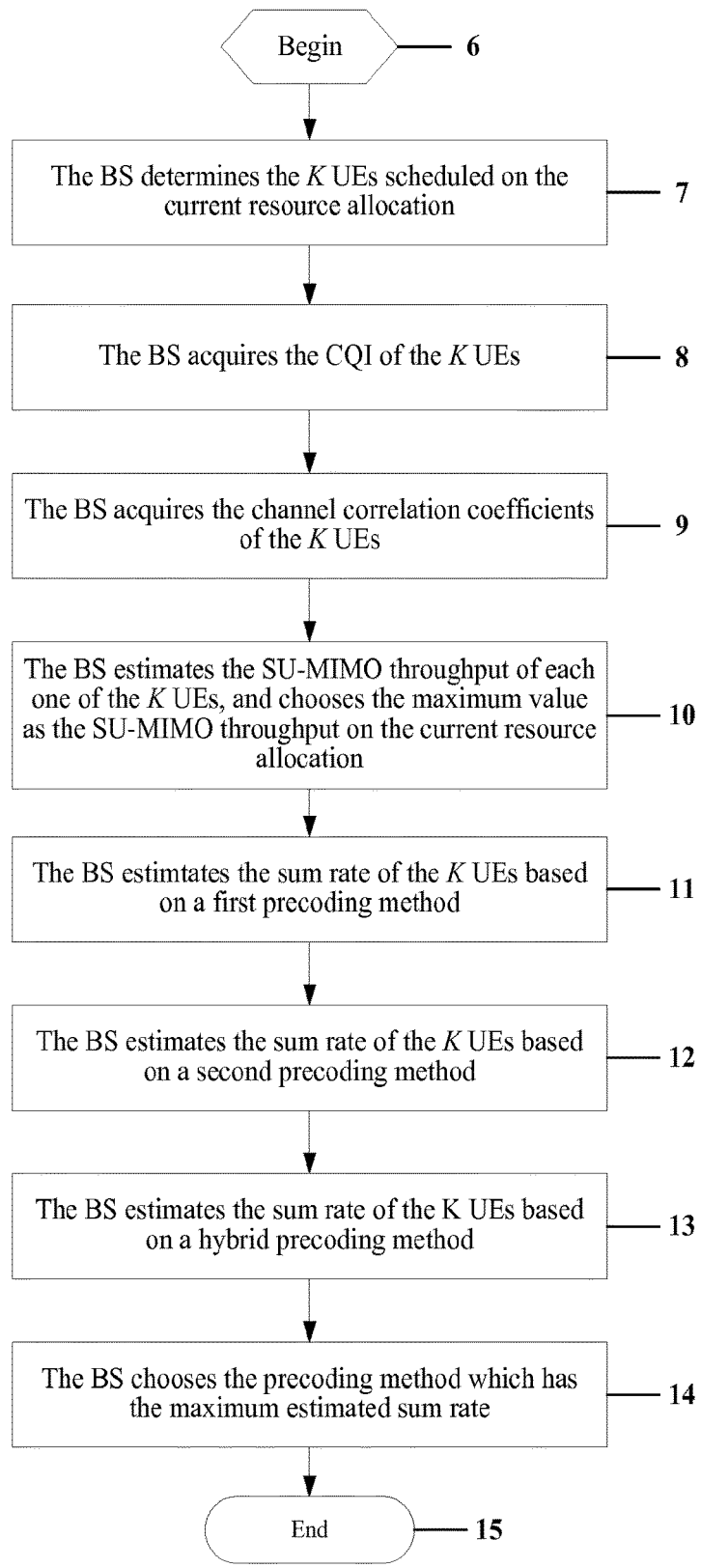
FIG. 2 is an illustration of the operation process of adaptive precoding in a BS.

Another embodiment is a method for adaptive precoding using the above MU-MIMO CQI estimation, which is presented in FIG. 2. After the process starts 6, the BS first determines the K UEs scheduled on the current resource allocation 7. Next, the BS acquires the CQI values of the K UEs 8. Based on these CQI values, the BS then acquires the channel correlation coefficients of the KUEs 9. Then, the BS estimates the SU-MIMO throughput of each one of the K UEs and chooses the maximum values as the SU-MIMO throughput on the current resource allocation 10. Next, the BS estimates the sum rate of the K UEs based on a first precoding method 11. Then, the BS estimates the sum rate of the K UEs based on a second precoding method 12. Next, the BS estimates the sum rate of the K UEs based on a hybrid precoding method 13. With these estimates, the BS then chooses the precoding method which has the maximum estimated values 14. After it, the process ends 15. In this embodiment, the BS obtains the CQI values of the K UEs 8, which are represented as $1/\gamma_k$, k=1, . . . , K. These values may be fed back to the BS by UEs through the uplink control channel, or by estimation in the uplink transmission using channel reciprocity.

When the BS estimates the throughput of each of the K UEs 10, one method is to calculate $$C_k^{SU} = \log\left(1 + \frac{1}{\gamma_k}\right), k = 1, \cdots, K,$$

and choose the maximum of these K values as $C^{SU}$.

The BS may estimate the sum rate of the MU-MIMO user group based on a first precoding 11, e.g., CB. Methods of this calculation are listed below.

CB-1: the BS estimates the sum rate of CB as $$C^{CB} = \sum_{i=1}^{K} \log\left(\frac{\alpha_k^2 N}{K + KN\gamma_k - 1}\right).$$

CB-2: the BS acquires the normalized channel coefficient vector of the kth user as $u_k$. If $u_k$ is not a unit norm, replace it with $$\frac{u_k}{\|u_k\|_2}.$$

Then, the BS estimates the sum rate of $$CB \text{ as } C^{CB} = \sum_{k=1}^{K} \log \frac{\alpha_k^2}{\sum_{\substack{j=1 \\ j \neq k}}^{K} |u_k u_j^H|^2 + K\gamma_k}.$$

The BS may estimate the sum rate of the MU-MIMO user group based on a second precoding 12, e.g., ZF. Methods of this calculation are listed below.

ZF-1: the BS estimates the sum rate of the ZF precoding method according to $$C^{ZF} = \sum_{k=1}^{K} \log\left(\frac{\alpha_k^2(N-K+1)}{(1-\alpha_k^2-K\gamma_k)(K-1)+NK\gamma_k}\right).$$

ZF-2: the BS acquires the normalized channel coefficient vector of the kth user as $u_k$. If $u_k$ is not a unit norm, replace it with $$\frac{u_k}{\|u_k\|_2}.$$

Then, the BS estimates the sum rate of ZF as $$C^{ZF} = \sum_{k=1}^{K} \log \frac{\alpha_k^2\left(1 - \sum_{\substack{j=1 \\ j \neq k}}^{K} |u_k u_j^H|^2\right)^2}{(1 - \alpha_k^2 - K\gamma)\sum_{\substack{j=1 \\ j \neq k}}^{K} |u_k u_j^H|^2 + K\gamma_k}.$$

Furthermore, the BS may divide the K UEs into two sets. The first set $\Omega_1$ includes $K_1$ UEs with a first precoding, e.g., CB, while the second set $\Omega_2$ includes the remaining $K_2 = K - K_1$ UEs with a second precoding. One possible method to divide the UEs is based on the SU-MIMO CQI, e.g., the UEs with SU-MIMO CQI values lower than a predefined threshold value belong to $\Omega_1$ and the rest of the UEs belong to $\Omega_2$. Suppose that the UE indices of $\Omega_1$ are $\{i_1, \ldots, i_{K_1}\}$ and the UE indices of $\Omega_2$ are $\{j_1, \ldots, j_{K_2}\}$.

The BS estimates the sum rate of the UEs in set $\Omega_1$ as $$C^{CB,\Omega_1} = \sum_{k=1}^{K_1} \log\left(\frac{\alpha_{i_k}^2 N}{K + KN\gamma_{i_k} - 1}\right)$$

or $$C^{CB,\Omega_1} = \sum_{k=1}^{K_1} \log \frac{\alpha_{i_k}^2}{\sum_{\substack{l=1 \\ l \neq i_k}}^{K} |u_{i_k} u_l^H|^2 + K\gamma_{i_k}}.$$

The BS estimates the sum rate of the UEs in set $\Omega_2$ as $$C^{ZF,\Omega_2} = \sum_{k=1}^{K_2} \log\left(\frac{\alpha_{j_k}^2(N-K_2+1)}{(1-\alpha_{j_K}^2 - K_2\gamma_{j_k})(K_2-1) + (K_1-1) + NK\gamma_{j_k}}\right)$$

or $$C^{ZF,\Omega_2} = \sum_{k=1}^{K_2} \log \frac{\alpha_{j_k}^2\left(1 - \sum_{\substack{l=1 \\ l \neq j_k}}^{K_2} |u_{j_k} u_l^H|^2\right)^2}{(1 - \alpha_{j_k}^2 - K_2\gamma_{j_k})\sum_{\substack{l=1 \\ l \neq j_k}}^{K_2} |u_{j_k} u_l^H|^2 + \sum_{i \in \Omega_1} |u_{j_k} u_i^H|^2 + K\gamma_{j_k}}.$$

The BS estimates the sum rate of the K UEs based on the hybrid precoding 13 as $C^{Hybrid} = C^{CB,\Omega_1} + C^{ZF,\Omega_2}$. After the BS obtains the values of $C^{SU}$, $C^{CB}$, $C^{ZF}$, and $C^{Hybrid}$, it compares these four values and chooses the precoding method which has the maximum or close to maximum estimated sum rate 14.

Once the adaptive precoding is completed on each resource block for the current time instant 15, each resource block may have a different precoding method in the next time instant.

In the formulas presented above, it is assumed that the BS acquires the CSI errors of the K users. Three methods are presented below for the BS to acquire the CSI errors.

In the first method referred to as FDD-1 for a FDD system where the CSI is fed back by UEs, each UE calculates its correlation coefficient and feeds it back to the BS through the uplink control channel. At the UE side, it estimates the channel vector $\hat{h}_k$ (represented as a column vector) between the BS and itself. Then, it quantizes $\hat{h}_k$ as $v_k$ (also a column vector) in a codebook set which is stored in the UE's memory. The correlation coefficient could be calculated as $$\alpha_k = \frac{|\hat{h}_k^H v_k|}{\|\hat{h}_k\|_2},$$

where $\|x\|_2$ denotes the 2-norm defined as $$\|x\|_2 = \sqrt{\sum_{i=1}^{n} |x_i|^2}.$$

Then, $a_k$ is quantized and fed back to the BS through uplink control channel or shared data transmission channel.

In the second method referred to as FDD-2 for an FDD system where the CSI is fed back by UEs, the CSI errors of all UEs are estimated as the same value as $$\alpha = \alpha_k = \sqrt{1 - \left(\frac{d}{2}\right)^2},$$

where d is the average distance between any two vectors in the codebook set. If the codebook includes M vectors, then M could be calculated as $$d = \frac{\sum_{i<j} \sqrt{1 - |v_i^H v_j|^2}}{M(M-1)},$$

where $v_i$ and $v_j$ are two different vectors in a codebook set. An alternative estimation is $$\alpha = \beta\sqrt{1 - \left(\frac{d_{max}}{2}\right)^2},$$

where $0<\beta<1$ is a scaling factor which may be determined by the BS itself, and $d_{max}$ is the maximum distance between any two vectors in the codebook set.

The third method referred to as TDD-1 is for a TDD system where the downlink CSI is acquired by the BS employing the channel reciprocity of the uplink transmission. Let the uplink channel quality of the kth user be $SNR_k^{UL}$, then one possible way to estimate the channel coefficient is $$\alpha_k = \sqrt{\frac{SNR_k^{UL}}{SNR_k^{UL} + g}},$$

where the parameter g is a function of the number of the transmitting antennas of BS, e.g., g=N.

Furthermore, $a_k$ may be modified by the BS according to the Hardware Impairment Parameters (HIP) and the Current Temperatures (CT) of the UE to compensate for the effects caused by impairments of the UE's hardware.

Figure 3:
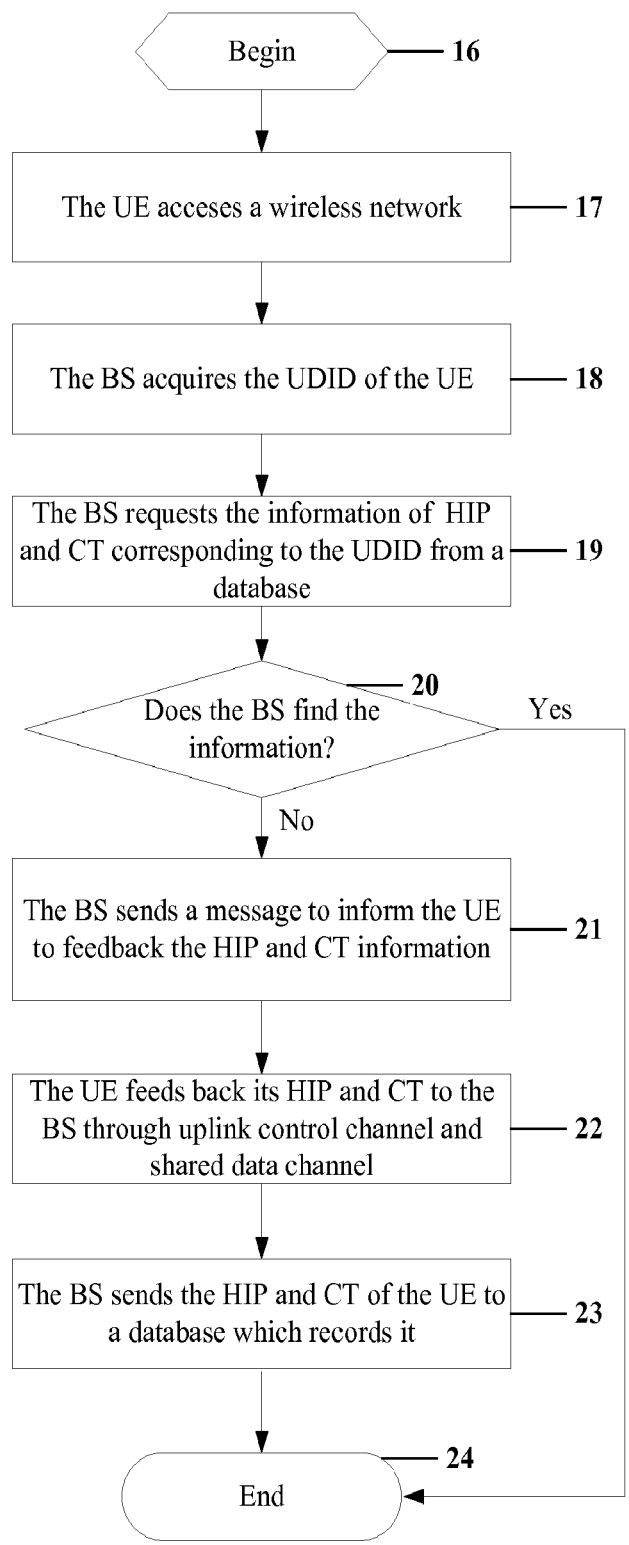
FIG. 3 is an illustration of the process of a BS obtaining the Hardware Impairment Parameters (HIP) and the Current Temperatures (CT) of a UE.

Hardware impairment is a limiting factor in MU-MIMO. In one embodiment, the BS uses information about the circuits in the BS and/or the UEs, such as the information included in the HIP of a UE and the CT at which the UE is operating, to modify the precoding to compensate for the effects caused by imperfections and nonlinearities in the hardware. The HIP of an UE may include parameters that capture the imperfections and nonlinearities in the hardware of the UE. The HIP may also include these parameters under different operating temperatures. The HIP of a UE may be characterized at factory or before being sold or given to a user. This can be done using an automated test equipment, which may include a temperature chamber that tests the UE under different temperatures in the operating temperature range to obtain its HIP. The HIP, including its variations under different temperatures, may be stored in a database, or the UE or both. The process of a BS obtaining the HIP and CT of a UE is presented in FIG. 3. The process begins 16 when a UE accesses a wireless network 17, typically for the first time. Then, the service BS acquires the Unique Device Identity (UDID) information of the UE 18. The BS may then use the UDID to request the HIP and CT from a database 19, which may be connected to the backbone network or at a centralized processing node. The database may also be shared by the networks of multiple carriers. The BS checks if the information can be found from the database 20. If the BS succeeds in retrieving the HIP and CT information for the UDID, the process ends 24. The BS may request the UE to periodically send the UE's CT to the BS and the BS uses the CT to determine the proper HIP to use for the UE. If the BS could not retrieve the HIP and CT information for the UDID, it may send a request to inform the UE to feed back its HIP and CT 21. After receiving this request, the UE sends its HIP and CT to its service BS through the uplink control channel or shared data channel 22. The BS may sends the HIP and CT to a database for storage 23 so that in the future, the same UE will no longer be required to send its HIP to a BS in the network or any BS that can access the database. The BS may also store a copy of the HIP locally for faster processing. Furthermore, when handover is needed as a UE moves from the ith BS to the jth BS, the ith BS may send the HIP and CT information to the jth BS through the backbone or some other connection between them. In an embodiment in which multiple BSs share a centralized node for baseband processing the HIP and the CT may be stored or cached at the centralized node, thus accessible to all neighboring BSs and reducing handover overhead. Since the HIP includes characterization of the hardware impairments at different temperatures, a service BS may require or receive the CT from a UE periodically so that it can apply the HIP at the correct CT for the processing to compensate for the hardware impairments.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A method for compensating hardware impairments and circuit conditions in precoding comprising
storing Hardware Impairment Parameters (HIPs) of a User Equipment (UE) that describe imperfections and/or nonlinearities in the UE hardware in a database that a Base Station (BS) can access to, wherein the UE has a Unique Device Identity (UDID) and said UE HIPs are associated with the UDID;
the BS acquiring the UDID of the UE;
the BS obtaining the stored HIPs of the UE from the database using the UDID; and
the BS using the obtained HIPs in the precoding to compensate hardware impairments and circuit conditions in the UE.

2. The method in claim 1 further comprising the BS obtaining HIPS of multiple UEs and using the obtained HIPs in a MU-MIMO precoding to compensate hardware impairments and circuit conditions in said multiple UEs.

3. The method in claim 1, wherein the Hardware Impairment Parameters (HIPs) corresponding to different operating temperatures are stored in the database, further comprising
the BS requesting the UE to send the UE's real-time operating temperature to the BS,
the BS obtaining the HIPs corresponding to the received UE's operating temperature, and
the BS using HIPs corresponding to the received UE's operating temperature in the precoding compensation.

4. The method in claim 1 further comprising
the BS requesting a UE to feed back the UE's HIPs to the BS if the BS cannot obtain the HIPs of the UE using the UE's UDID; and
after receiving this request, the UE sending the UE's HIPs to the BS.

5. The method in claim 4 further comprising the BS sending the UE's HIPs to said database for storage.

6. The method in claim 1 further comprising when a handover is needed as the UE moves from a first BS to a second BS, the first BS sending the HIPs of said UE to the second BS through a network.

7. The method in claim 1 further comprising sharing said database in a network of multiple carriers.

* * * * *